April 29, 1941.  A. E. PAPP  2,239,900
CABLE CONNECTING MEANS
Filed April 15, 1938
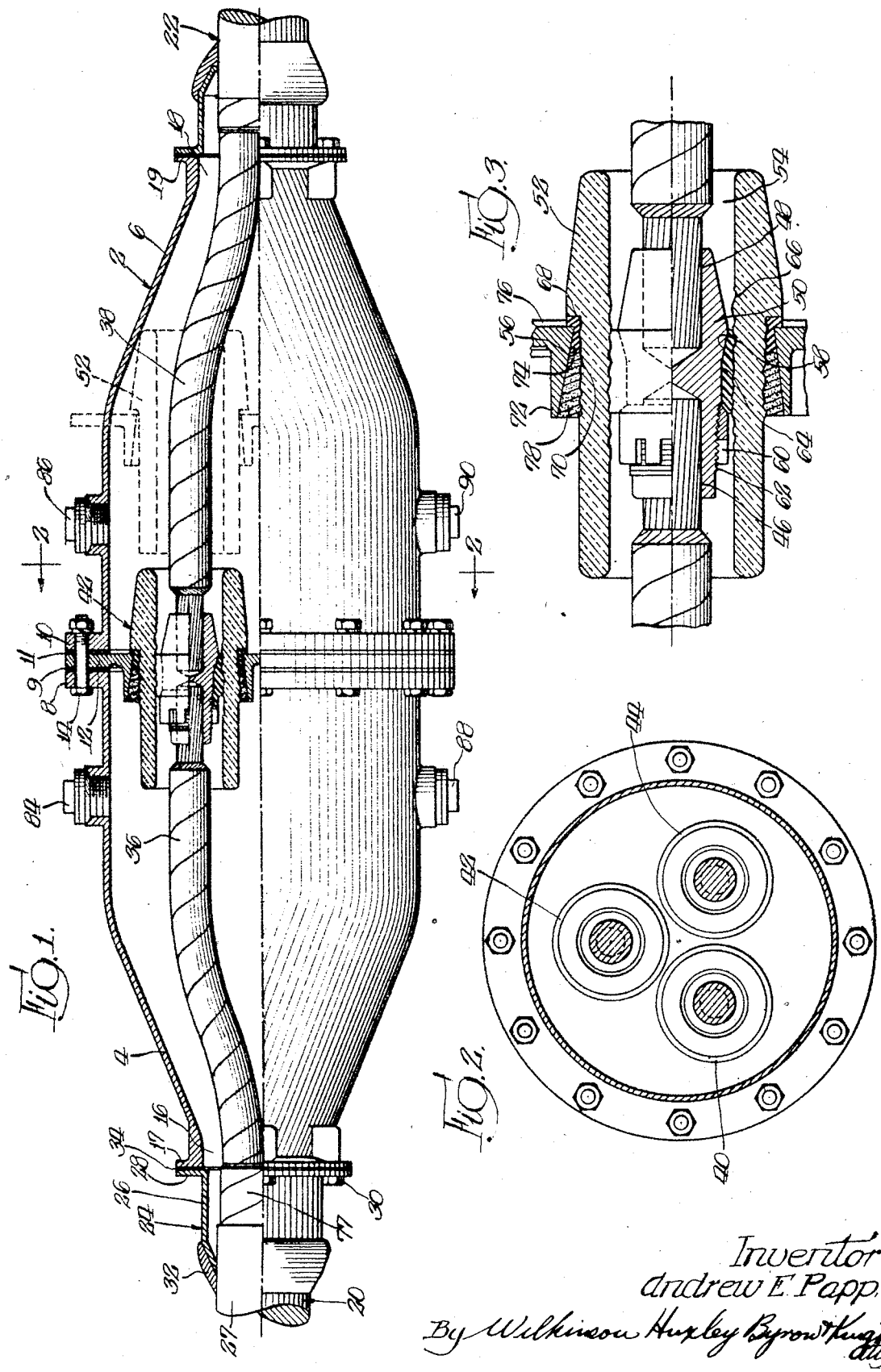
Inventor:
Andrew E. Papp,
By Wilkinson Huxley Byron Knight
Attys Patented Apr. 29, 1941

2,239,900

UNITED STATES PATENT OFFICE 2,239,900

CABLE CONNECTING MEANS

Andrew E. Papp, Chicago, Ill., assignor to G & W Electric Specialty Co., Chicago, Ill., a corporation of Illinois Application April 15, 1938, Serial No. 202,193

9 Claims. (Cl. 174—22)

The present invention relates to electrical devices, and more in particular to connections at the junction of electrical cables.

The electrical device herein disclosed is used for effecting connections between electrical cables. One form of such device generally known as a stop joint is used at intervals between sections of cables to provide a connection therebetween. Such device is formed with a partitioned housing which divides the same into at least two compartments, in certain of which compartments insulating fluid or compound may be introduced for insulating purposes and for displacing the air to eliminate corona discharges. Fluid-tightness is provided at the partition in order to keep the mobile oil or insulating fluid used in impregnating the cable or cables on one side of the partition from flowing past or through the joint due to a difference in pressure and/or temperature, which flow is highly undesirable because the supply of oil or insulating fluid in the high parts of the cable would be depleted, thereby impairing its dielectric strength.

Furthermore, fluid-tightness at the partition is highly desirable where different types of cables are to be connected together, one requiring an insulating fluid and the other, such as a rubber covered cable, requiring no insulating material, and which rubber covering would, if in contact with insulating fluid such as oil, deteriorate rather rapidly. Thus, in the devices contemplated, the fluid-tight partition assembly acts as a barrier preventing flow or seepage of such oil from one compartment to another and into contact with a cable having a covering which would be injured thereby.

Still further, the fluid-tightness at the partition prevents intermingling of different insulating fluids or compounds used in the compartments of the device.

Heretofore, constructions of the type above discussed have been of complicated and elaborate constructions in order to provide the necessary fluid-tightness at the joint or joints between the cable ends. This has been necessitated because of the metal at the joints which have been heretofore provided, and the elaborateness of the construction and assembly has been needed in order to preserve the necessary electrical clearances and to prevent creepage. These constructions have involved, for that reason, insulation of large size and complicated mechanisms to properly handle these insulating parts and to properly support the cables to provide the fluid-tight joints.

The present invention has for an object, however, to provide a unique and novel electrical device better known as a stop joint for the junction of electric cables, which is of extreme simplicity in design and the parts so constructed and arranged that the assembly can be effected rapidly and with a great deal of ease.

Another object of the present invention is to provide a novel electrical device in the nature of a stop joint at the junction of electrical cables, which is formed with a small number of parts easily assembled; one which is exceedingly low in cost as compared to the more elaborate and involved structures heretofore known and used under similar conditions, and one which meets all of the service requirements as above outlined.

Another object of the present invention is to provide a novel stop joint at the junction of electrical cables which, although easily assembled, provides a positive and effective fluid-tight construction at the joint or joints under all conditions of service.

Still a further object within the purview of the present invention is to provide a novel stop joint at the junction of electrical cables which is so constructed and arranged that the device can be conveniently and rapidly disassembled at any time where repair or replacement of parts is found necessary.

It is accordingly a further object of the present invention to provide a novel electrical device of the form last above described for connecting cables together whereby the advantages attending the use of such device may be secured.

Other objects, features, capabilities and advantages are comprehended by the invention, as will later appear and as are inherently possessed thereby.

Referring to the drawing:

Figure 1 is a view in elevation of a device made in accordance with the present invention, parts thereof being broken away to show certain details of construction thereof;

Figure 2 is a view in cross-section taken in the plane represented by line 2—2 of Figure 1 of the drawing;

Figure 3 is a fragmentary detached view in vertical cross-section of one of the stop joints of the device disclosed in Figure 1 of the drawing;

Referring now more in particular to the drawing, an embodiment selected to illustrate the present invention is generally referred to as 2 and comprises a housing or casing formed in part by the end member 4 and in part by the end member 6 provided with the outwardly extending peripheral flanges 8 and 10, respectively, between which is secured a center flange or partition member 12 as by means of a plurality of bolts 14 passing through aligned openings in the peripheral flanges 8 and 10 and the flange or partition member 12. In order to provide a fluid-tight joint at this point, gaskets 9 and 11, which are of material unaffected by oil or other insulating fluids or compounds, are interposed between flange 8 and partition member 12 and partition member 12 and flange 10, respectively.

Housing members 4 and 6 are of similar construction and are provided with openings 16 and 18, respectively, flanged as at 17 and 19, and through which openings extend sheathed cables 20 and 22. These cables 20 and 22 are mounted in the end housing members by means of joints, such as 24, each of which comprises a sleeve 26 embracing the cable and being provided with a flange 28 adapted to abut with flanges such as 17 or 19 of the end parts 4 or 6 and being secured thereto by means of bolts 30, a gasket 34 of material unaffected by oil or other insulating fluids or compounds being provided at these joints to provide a fluid-tight construction. Each of the joints between the sleeve 26 and the metallic sheathing or covering 27 for the cable is wiped, as by solder or the like at 32, to provide a fluid-tight joint between the cable and the end part of the device.

Although I have shown a wiped sleeve joint for connection of the cables to the housing, it is to be understood that any type of joint may be provided to effect the desired fluid-tight connection at these points.

In the present embodiment each of the cables 20 is made up of three insulated cable conductors such as 36 and 38, whereby three separate joints, such as 40, 42 and 44, are provided at the partition member 12 to effect a connection between oppositely disposed cable conductors, although it is to be clearly understood that any number of joints may be provided for connecting the opposed cable conductors together in the manner illustrated herein, if it is so desired.

For illustrative purposes, inasmuch as joint 42 is in all respects the same as joints 40 and 44, reference will be made to said joint for the purpose of illustrating the present novel construction, it being understood, however, that the following comments equally apply to said joints 40 and 44.

The opposed cable conductors 36 and 38 are stripped of insulation for a desired distance from the extreme end thereof whereby the same are adapted to be received within the oppositely disposed recesses 46 and 48 of a connector 50, the cable conductors being secured in said recesses by a sweated joint as by means of the application of solder or the like. The connector 50 and the cable conductors are embraced by an insulator sleeve or tube 52 having an internal opening or passageway 54 therethrough which receives the cable conductors and the connector, this insulator being preferably formed of porcelain or the like and being disposed through an opening 56 of the center flange or partition member 12.

The connector 50 is provided with an abutment 58, which, in the illustrative embodiment, is tapered, oppositely disposed in respect to a castellated compression nut 60 threaded as at 62 on the outside of one end of the connector 50. This castellated nut 60 is movable on the threads relative to the connector 50 for adjustably compressing a gasket 64 formed of some compressible material unaffected by oil or other insulating fluids or compounds, disposed between the fixed abutment 58 and the movable abutment formed by the adjustable castellated compression nut 60. This gasket 64 is in surface contact with a surface portion 66 of the internal bore 54 of insulator 52 which, in the illustrative embodiment, is roughened or wavy, and when compressed by tightening of the castellated nut 60 firmly and intimately contacts said surface 66 to mount the connector 50 and the attached cable ends in the insulator 52 and to provide a fluid-tight joint between the connector 50 and the insulator 52. Gasket 64, upon being compressed by nut 60, provides a fluid-tight joint between the connector 50 and the insulator 52, which can be readily and easily assembled and disassembled, thus preventing passage of insulating fluid or compound from one chamber to the other formed by partition member 12.

The insulator 52 is formed on the exterior surface thereof with an annular shoulder or abutment 68 adjacent which is disposed a roughened surface 70 which, when the insulator 52 is in its intended position within opening 56, is disposed in opposite relation to the opening 56. Opening 56 tapers toward the right as shown in Figures 1 and 3 and is formed in part by the annular flange 72 axially extending from the center flange or partition member 12. The joint between the insulator 52 and the partition member is formed by means of a gasket 74 of compressible material unaffected by oil or other insulating fluid or compound. This gasket embraces the insulator 52 in engaging relation to the roughened surface 70 thereof, the same being further provided with a radially extending part 76 disposed between the abutment 68 and the partition member 12.

The insulator 52 is held in its position relative to partition member 12 by means of cementitious material 78 such as Portland cement or the like, disposed between insulator 52 and flange 72 of partition member 12. In making this connection, gasket 74 is assembled in embracing relation to insulator 52 and the partition member 12 brought into contact therewith, after which the insulator and partition member are clamped together to compress gasket 74 the desired amount to provide a fluid-tight joint between the insulator and the partition member. The cementitious material is then placed in position while these members are clamped and allowed to set or mature, after which the clamps are released, the gasket being held in its compressed condition to provide a fluid-tight joint between the insulator and partition member by the matured cementitious material.

Although I have shown an arrangement including a cementitious material for holding the gasket in compression to provide a fluid-tight joint and to secure the insulator to the partition member, it is to be understood that any type of securing means may be provided, as for example, a mechanical clamp or a compression gasket fitting such as is used to provide the connection between the connector and insulator.

In shipping these devices, the end members with sleeves 26 are assembled together with the center flange 12, all as shown in the drawing. For convenience, the porcelain sleeves 52 are mounted in the center flange 12 as indicated, and the connectors 50 are temporarily mounted in the porcelain sleeves by means of gaskets 64 and castellated nuts 60.

When such a device is received on the job where a connection is to be made, the installation can be effected by first removing bolts 14 to separate end parts 4 and 6 of the housing and to remove the connectors 50. The cables are then prepared by stripping the metal casing 27 to a point as shown to be within the sleeves 26 when the device is assembled and at the same time removing outer belt 77 to a point inside the metal casing whereby the separate cable ends are free and independent of one another for splicing, as described. At this time connectors are removed from the insulators 52. In order to permit unrestricted movements of the operator while splicing the cable conductors, the end housing member 4 and sleeve 26 therefor are slipped over cable 20 out of the way, after which end housing member 6 and its associated sleeve 26 are slipped over cable 22.

The center flange or partition member with the sleeves 52 connected thereto are slipped over the cable conductors 38 to the dotted line position shown in Figure 1 of the drawing, while at the same time the castellated nuts 60 and gaskets 64 can be removed from the connectors and slipped over the cable conductors 38 of cable 20. The cable conductors, such as 36 and 38, are then spliced to connectors 50 in the usual manner, as by soldering, during which operation the threads 62 of the connectors are protected by tape from the solder.

After this connection is made between the cable conductors, the center flange or partition member 12 is moved over connectors until the same are centered within the porcelain sleeves 52, after which the gaskets 64 and nuts 60 can be moved into position over the connectors and the nuts tightened securely to form the joint between the connectors and the insulators 52.

The end housing members can then be brought up into position in association with the center flange 12 and the gaskets 9 and 11 and the entire housing secured in assembled relation by tightening bolts 14. The joints 24 can then be wiped to cable sheaths to provide a tight joint at those points.

If desired, or if it becomes necessary in the field, the joint between sleeves 52 and partition member 12 can be made by clamping said sleeve and partition member together with gaskets 74 in place, after which the cementitious material 78 is poured and allowed to set or mature. This method could be followed in case of repair.

This type of joint provides an effective barrier dividing the housing into two separate and distinct chambers, access to one of which is secured through plug 84 threaded in the housing member 4 and access to the other of which is gained through plug 86 threaded in the housing member 6, this structure being provided for introduction of some insulating fluid or compound which may be the same or different for each of the two chambers.

Oppositely disposed in relation to plug 84 is a plug 88 mounted in the bottom of the housing member 4 whereby access can be gained to the chamber formed therein for boiling out the joints on that side of the partition member 12, while oppositely disposed in relation to plug 86 is another plug 90 in the bottom of the housing member 6 whereby access to the chamber can be secured for boiling out the joints formed on that side of the partition member 12.

Initially the joints are prepared by opening plugs 88 and 90 and boiling out the joints on each side of the partition member 12, after which the plugs are replaced and plugs 84 and 86 removed for the introduction of some insulating fluid or compound.

While I have herein described and upon the drawing shown an illustrative embodiment of the invention, it is to be understood that the invention is not limited thereto but may comprehend other constructions, arrangements of parts, details and features without departing from the spirit of the invention.

I claim:

1. In an electrical stop joint, the combination of a housing, a partition for said housing having an insulator member extending laterally thereof and providing an opening through said partition, an insulated cable conductor extending into said insulator member, said insulation terminating in spaced relation to the end of said cable conductor, a connector mounted in said insulator member and connected to said cable conductor, said insulator embracing said connector and cable conductor and being disposed in overlapping relation to said insulation, and readily replaceable means for providing a fluid-tight joint between said insulator member and connector.

2. In an electrical stop joint, the combination of a housing, a partition for said housing having an insulator member extending laterally thereof and providing an opening through said partition, opposed insulated cable conductors extending into said insulator member, said insulation terminating in spaced relation to the ends of said cable conductors, and a connector mounted in said insulator member and being connected to said cable conductors, said insulator embracing said connector and cable conductors and being disposed in overlapping relation to said insulation, and readily replaceable means for providing a fluid-tight joint between said insulator member and connector.

3. In an electrical stop joint, the combination of a housing, a partition for said housing having an insulator member extending laterally thereof and providing an opening through said partition, opposed insulated cable conductors extending into said insulator member, said insulation terminating in spaced relation to the ends of said cable conductors, a connector disposed within said insulator member and connected to said cable conductors, and means for mounting said connector in said insulator member to provide a fluid-tight joint therebetween and providing for relative movement between said insulator member and connector during assembly.

4. In an electrical stop joint, a housing, an apertured partition for said housing having an insulator sleeve extending laterally thereof, a connector mounted within said sleeve, and means intermediate the ends of said insulator sleeve and circumferentially engaging the same to connect said connector and sleeve and to provide a flexible fluid-tight mounting for said connector within said insulator sleeve.

5. In an electrical stop joint, a housing, an apertured partition for said housing having an insulator sleeve, opposed cable conductors extending into said sleeve, a connector mounted within said sleeve for connecting said cable conductors together, a body of compressible material embracing said connector, and means for compressing said material to increase its external diameter to engage said insulator sleeve circumferentially intermediate its ends to provide a fluid-tight joint between said connector and insulator sleeve and to hold the same in assembled relation.

6. In an electrical stop joint, a housing, an apertured partition for said housing having an insulator sleeve, opposed cable conductors extending into said sleeve, a connector mounted within said sleeve for connecting said cable conductors together and provided with fixed and adjustable abutments, a body of compressible material embracing said connector and disposed between said abutments whereby upon adjustment of said adjustable abutment the external diameter of said material is increased to engage said insulator sleeve circumferentially intermediate its ends to provide a fluid-tight joint between said connector and insulator sleeve and to hold the same in assembled relation.

7. In an electrical stop joint, a housing, an apertured partition for said housing, an insulator sleeve mounted in said partition, opposed cable conductors extending into said sleeve, said insulator sleeve having a roughened inner surface, a connector mounted within said sleeve for connecting said cable conductors together and provided with fixed and adjustable abutments, a body of compressible material embracing said connector and being disposed between said abutments whereby upon adjustment of said adjustable abutment the external diameter of said material is increased to engage the said roughened inner surface of said insulator sleeve to provide a fluid-tight joint between said connector and insulator sleeve and to hold the same in assembled relation.

8. In an electrical stop joint, the combination of a housing, a partition member therefor, an insulating sleeve mounted therein and having an uninterrupted internal insulating wall, opposed cable conductors extending into said sleeve, a connector embraced by said sleeve for connecting said cable conductors, and readily replaceable means providing a flexible fluid-tight joint between said connector and sleeve.

9. In an electrical stop joint, the combination of a housing, a partition member therefor, an insulating sleeve mounted therein and having an uninterrupted internal insulating wall, opposed cable conductors extending into said sleeve and being disposed in spaced relation thereto, a connector embraced by said sleeve for connecting said cable conductors, and readily replaceable means providing a flexible fluid-tight joint between said connector and sleeve.

ANDREW E. PAPP.